(12) United States Patent
Yankov

(10) Patent No.: US 7,872,788 B2
(45) Date of Patent: Jan. 18, 2011

(54) METHOD OF DIGITALLY PROCESSING OPTICAL WAVES IN INTEGRATED PLANAR OPTICAL DEVICES THAT OPERATE ON THE PRINCIPLE OF DIGITAL PLANAR HOLOGRAPHY

(76) Inventor: Vladimir Yankov, 280 S. Chestnut St., Washington Township, NJ (US) 07676

( * ) Notice: Subject to any disclaimer, the term of this patent is extended or adjusted under 35 U.S.C. 154(b) by 0 days.

(21) Appl. No.: 12/806,407

(22) Filed: Aug. 13, 2010

(65) Prior Publication Data
US 2010/0309534 A1 Dec. 9, 2010

Related U.S. Application Data

(62) Division of application No. 12/011,453, filed on Jan. 28, 2008.

(51) Int. Cl.
*G03H 1/16* (2006.01)
(52) U.S. Cl. .......................................... 359/29; 438/65
(58) Field of Classification Search .................. 359/29; 438/65
See application file for complete search history.

(56) References Cited

U.S. PATENT DOCUMENTS 6,760,359 B2 * 7/2004 Evans .......................... 372/102

| | | |
|---|---|---|
| 2003/0039444 A1 | 2/2003 | Mossberg et al. |
| 2003/0117677 A1 | 6/2003 | Mossberg |
| 2004/0036933 A1 | 2/2004 | Yankov et al. |
| 2004/0170356 A1 | 9/2004 | Iazikov et al. |
| 2006/0126992 A1 | 6/2006 | Hashimoto et al. |
| 2006/0233493 A1 | 10/2006 | Mossberg et al. |
| 2007/0034730 A1 | 2/2007 | Mossberg et al. |
| 2007/0053635 A1 | 3/2007 | Yazikov et al. |

* cited by examiner

*Primary Examiner*—Alessandro Amari
*Assistant Examiner*—Jennifer L. Doak

(57) ABSTRACT

A method of digitally processing light waves passing through a planar structure having given functions $f_{in}(x, y, \omega)$ and $f_{out}(x, y, \omega)$ and consisting of a light-propagating and distributing layer. This layer contains a plurality of interconnecting pattern elements of a holographic pattern and a plurality of planar optical elements arranged in a predetermined pattern on the aforementioned light-propagating and distributing layer. The method consists of calculating positions and shapes of the interconnecting pattern elements of the holographic pattern based on the aforementioned given functions by solving an inverse problem. The interconnecting pattern elements have refractive indices different from the refractive indices of the light-propagating and distributing layer and are manufactured on the basis of the results of the calculations. The aforementioned continuous function is digitized, and the obtained digitized planar holographic pattern is used for converting the function $f_{in}(x, y, \omega)$ into the function $f_{out}(x, y, \omega)$.

7 Claims, 3 Drawing Sheets

METHOD OF DIGITALLY PROCESSING OPTICAL WAVES IN INTEGRATED PLANAR OPTICAL DEVICES THAT OPERATE ON THE PRINCIPLE OF DIGITAL PLANAR HOLOGRAPHY

CROSS REFERENCE TO RELATED APPLICATIONS

The present application is division of U.S. patent application Ser. No. 12/011,453 filed Jan. 28, 2008 and entitled "Method of Digitally Processing Optical Waves and an Integrated Planar Optical Device Based on Digital Planar Holography"

FIELD OF THE INVENTION

This invention relates to the processing of light or other waves inside planar integrated circuits consisting of a plurality of repeated standard elements such as lasers, amplifiers, detectors, and fast saturated absorbers, interconnected through digital planar holograms. More specifically, the invention relates to a method of digitally processing optical waves in integrated planar optical devices that operate on the principle of digital planar holography.

BACKGROUND OF THE INVENTION

Processing and transmission of information with light requires creation of integrated optical circuits. While the idea is not novel, integrated circuits with the use of light do not repeat the success of electronic integrated circuits, while most important active and non-linear optic elements like lasers, amplifiers, detectors, and fast saturating absorbers, are routinely made in planar waveguides with microlithography, then diced and connected with optical fibers. It is much like the use of transistors before the invention of electronic integrated circuits. One of the main reasons is the problem of interconnection. Electric current easily follows through bends of a conductor, thereby facilitating interconnections among several layers. The light tends to propagate in a straight line; therefore, interconnections among several layers are difficult. Sometimes active elements are interconnected by ridge waveguides in a single waveguide, but this method is limited due to the crossing of ridge waveguides in a single layer. Thus, there is a great need for interconnecting many optical elements in a single waveguide.

Attempts have been made heretofore to provide planar optical devices by interconnecting many optical devices on a single substrate. For example, U.S. Patent Application Publication No. 20070034730 published in 2007 (inventor T. Mossberg, et al.) discloses a method that comprises the steps of forming a planar optical waveguide that confines in one transverse spatial dimension an optical signal propagating in two other spatial dimensions, and forming a set of diffractive elements in the planar optical waveguide. The latter is arranged so as to support multiple optical transverse modes in the confined transverse dimension. Each diffractive element set is arranged so as to route, between a corresponding input optical port and a corresponding output optical port, a corresponding diffracted portion of the optical signal propagating in the planar waveguide that is diffracted by the diffractive element set. The diffractive elements are arranged so that the optical signal is successively incident on the diffractive elements; and the diffractive elements and the planar optical waveguide are arranged so that the corresponding diffracted portion of the optical signal reaches the corresponding output optical port as a superposition of multiple optical transverse modes supported by the planar optical waveguide.

U.S. Patent Application Publication No. 20060233493 published in 2006 (inventor T. Mossberg, et al.) discloses a method comprising the steps of receiving an input optical signal successively incident on a set of diffractive elements in an optical medium. The optical medium enables substantially unconfined propagation of optical signal in three dimensions. At least a portion of the input optical signal passes through the set of diffractive elements and produces an output optical signal. The diffractive elements of the set are collectively arranged within the slab waveguide so as to exhibit a positional variation in amplitude, optical separation, or spatial phase over some portion of the set. Furthermore, the diffractive elements of the set collectively apply a transfer function to the input optical signal for producing the output optical signal, the transfer function being determined at least in part by said positional variation in amplitude, optical separation, or spatial phase exhibited by the diffractive elements of the set.

U.S. Patent Application Publication No. 20070053635 published in 2007 (inventor D. Lazikov, et al) discloses a method that comprises computing an interference pattern between a simulated design input optical signal and a simulated design output optical signal, and computationally deriving an arrangement of at least one diffractive element set from the computed interference pattern. The interference pattern is computed in a transmission grating region, with the input and output optical signals each propagating through the transmission grating region as substantially unconfined optical beams. The arrangement of diffractive element set is computationally derived so that when the diffractive element set thus arranged is formed in or on a transmission grating, each diffractive element set would route, between corresponding input and output optical ports, a corresponding diffracted portion of an input optical signal incident on and transmitted by the transmission grating. The method can further comprise forming the set of diffractive elements in or on the transmission grating according to the derived arrangement.

U.S. Patent Application Publication No. 20060126992 published in 2006 (inventor T. Hashimoto, et al.) discloses a wave transmission medium that includes an input port and an output port. The first and the second field distributions are obtained by numerical calculations. The first field distribution distributes the forward propagation light launched into the input port. The second field distribution distributes the reverse propagation light resulting from reversely transmitting from the output port side an output field that is sent from the output port when an optical signal is launched into the input port. A spatial refractive index distribution is calculated on the basis of both field distributions such that the phase difference between the propagation light and reverse propagation light is eliminated at individual points (x, z) in the medium. The elements of this system are also mounted on a planar substrate.

U.S. Patent Application Publication No. 20040036933 published in 2004 (inventor V. Yankov, et al.) discloses a method and device that provide efficient wavelength division multiplexing/demultiplexing (WDM) including reduced signal distortion, higher wavelength selectivity, increased light efficiency, reduced cross-talk, and easier integration with other planar devices, and lower cost manufacturing. The method and device include a planar holographic multiplexer/demultiplexer having a planar waveguide, the planar waveguide including a holographic element that separates and combines pre-determined (pre-selected) light wavelengths. The holographic element includes a plurality of holograms that reflect pre-determined light wavelengths from an incoming optical beam to a plurality of different focal points, each pre-determined wavelength representing the center wavelength of a distinct channel. Advantageously, a plurality of superposed holograms may be formed by a plurality of structures, each hologram reflecting a distinct center wavelength to represent a distinct channel to provide discrete dispersion. When used as a demultiplexer, the holographic element spatially separates light of different wavelengths and when reversing the direction of light propagation, the holographic element may be used as a multiplexer to focus several optical beams having different wavelengths into a single beam containing all of the different wavelengths.

However, in all aforementioned prior-art devices, for transformation of an input beam into an output beam, the inventors use holographic gratings with known functional properties determined by their parameters and geometry. Therefore, positions and optical parameters of the input and output beams strictly depend on the geometry of the grating, and this significantly limits design of the optical structure. Another disadvantage of the known methods and planar holographic devices is that they can provide a limited number of light-transmitting channels since each holographic pattern element works only with one or two channels.

BRIEF SUMMARY OF THE INVENTION

The method of the invention for digitally processing light waves passing through a digital planar holographic structure consists of making digital and analog light processors on a single chip consisting of a planar waveguide with several standard optical elements repeated many times. According to the invention, there may be active and nonlinear elements like lasers, amplifiers, and fast saturated absorbers that are made in planar semiconductor waveguides by microlithography means and that are interconnected by passive digital planar holograms written in the same waveguide. Each hologram can provide many interconnections. The planar waveguide can be monolithic; for example, the core can be made from a semiconductor like InPGaAs. The difference among lasers, amplifiers, and fast-saturated absorbers may be due to different voltages applied to these elements, different geometry, or chemical composition. Since light absorption in semiconductor holograms creates a problem, it may be eased by applying voltage to holograms or making a hybrid waveguide. Namely, active elements can be made in a semiconductor waveguide, while interconnecting holograms may be written in an attached transparent waveguide made of silica or another transparent material.

A hologram is a combination of millions of sub-wavelength (a fraction of micron) features recorded on a transparent media. A hologram may be a copy of an image or even of an optical device. After replicating an optical device, the hologram may be used instead of the device. Until the 1990s, analog holograms were made with conventional photo materials, copying existing objects only. Digital holography has been made possible when microlithography moved to sub-micron features. By means of calculations, it becomes possible to determine positions of holographic fringes. If the shape of a planar structure is known, as well as the positions of the input and output light beams, the finding of hologram-component coordinates is reduced to the solution of an inverse problem of finding a part of the boundary conditions based on the known functions $f_{in}(x, y, \omega)$ and $f_{out}(x, y, \omega)$, the structures, shapes, and positions of which have been calculated and which have never existed in reality as optical objects and which are then reproduced by methods of microlithography in the form of actual planar objects.

An inverse problem can be defined as a task wherein the values of some model parameter(s) must be obtained from the observed data.

In particular, the invention relates to the digital processing of lights, wherein chains of lasers, amplifiers, and fast saturating absorbers exhibit two or more attractors. A light logical gate is one example of a device that can be made by this new technology.

The approach of this invention is to characterize a device by Fourier components $f_{in}(x, y, \omega)$ and $f_{out}(x, y, \omega)$ of incoming and outgoing waves propagating between two elements and then to use these functions for calculating a desirable holographic pattern. For most applications, it is a variation of the effective refractive index in the following form:

$$\Delta n(x,y) = \int f_{in}(x,y,\omega) f_{out}(x,y,\omega) d\omega.$$

The proposed invention advantageously combines convenience of manufacturing and interconnecting optical elements within a single planar waveguide.

DETAILED DESCRIPTION OF THE INVENTION

Figure 1:
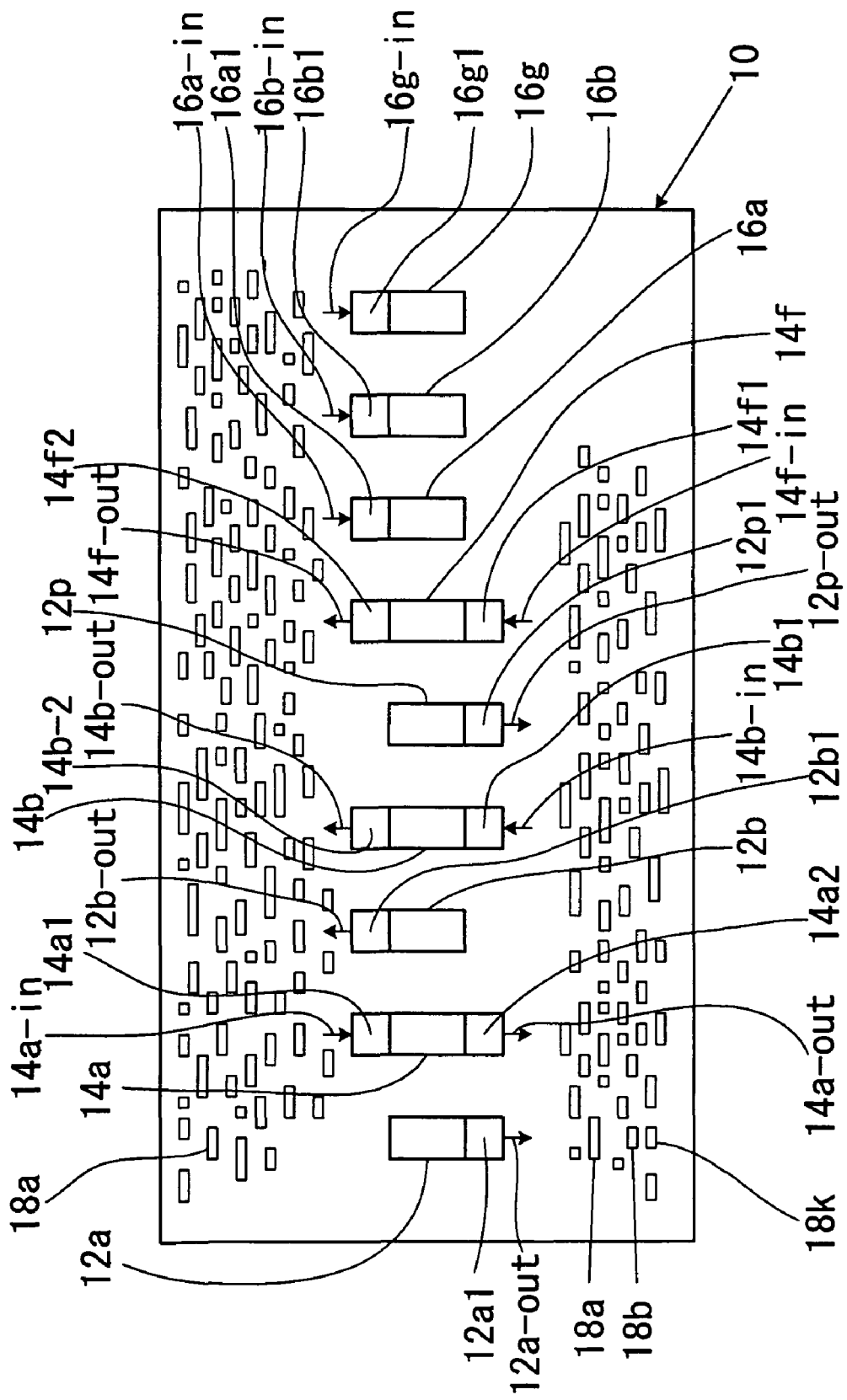
FIG. 1 is a schematic view that exemplifies a planar structure or a holographic chip of the invention with a digital planar optical holographic pattern.

The idea of the new planar geometry is to allow light to travel inside a hologram on thousands of wavelengths, thus greatly increasing the possibility to process the light.

Digital planar holography advantageously combines the possibility to write an arbitrary hologram with a long light path inside the hologram. The last technological obstacle was a good-quality blank planar waveguide. The waveguide must be approximately one micron thick, transparent, and very uniform in order to transmit light without distortion. The last condition is the most limiting, but it was mainly resolved by the optical industry to make arrayed waveguide gratings for optical fiber communication devices. After the problems associated with fabrication of sub-wavelength patterns were solved due to the progress in modern microlithography, only one problem needed for successful realization of the digital planar holography remained, i.e., determining the pattern to be written in order to make a desirable device.

By means of calculations, it becomes possible to determine the positions of holographic fringes. If the shape of the planar structure is known, as well as the positions of the input and output light beams, the finding of holographic pattern coordinates is reduced to the solution of an inverse problem of finding a part of the boundary conditions based on the known functions $f_{in}(x, y, \omega)$ and $f_{out}(x, y, \omega)$, an the structures, shapes, and positions of which have been calculated and which have never existed in reality as optical objects and which are then reproduced by methods of microlithography in the form of actual planar objects.

The approach of this invention is to characterize a device by Fourier components $f_{in}(x, y, \omega)$ and $f_{out}(x, y, \omega)$ of incoming and outgoing waves and then to use these functions for calculating a desirable holographic pattern. While real devices are three-dimensional, using a two-dimensional Hamiltonian model averaged over the third dimension should be satisfactory for many applications. Since waves propagate freely in a blank waveguide, it becomes possible to write interaction in the form of a Hamiltonian model. Since non-linear wave scattering can be neglected so that the Hamiltonian model can be presented as quadratic with respect to wave amplitude, we can assume linearity with respect to variations of the effective refraction index. Thus the Hamiltonian model can be written as follows:

$$H_{int} = \int f(x,y,\omega) \Delta n(x,y) f(x,y,\omega) d\omega$$

where $f(x, y, \omega)$ is the total wave function of specified frequency. Since all three functions under the integral sign are oscillating, the interaction is determined by resonances. It may be shown that in order to transform $f_{in}(x, y, \omega)$ into $f_{out}(x, y, \omega)$ one has to create variation of the effective refraction index, in arbitrary units, in the following form:

$$\Delta n(x,y) = \int f_{in}(x,y,\omega) f_{out}(x,y,\omega) d\omega$$

Many variations of the invention will be possible to those skilled in the art. Some variations include correcting the above formula for variation of $f_{in}(x, y, \omega)$ and $f_{out}(x, y, \omega)$ created by the hologram. To ease manufacturing, the function $\Delta n(x, y)$ should be substituted by binary (two-level) functions, preferably a composition of similar or identical elements. In other words, it is necessary to replace the continuous function $\Delta n = \Delta n(x, y)$ by a discrete function of $\Delta n(x, y)$. This procedure can be formulated as follows:

$$f_{in}(x, y, \omega) \cong \sum_{n,u} C_{nu} \exp(ik_n r_u) f(\omega)$$

$$f_{out}(x, y, \omega) \cong \sum_{m,v} C_{mv} \exp(-ik_m r_v) f(\omega)$$

where $k_n$ is the wave vector of an incoming wave, and $r_u$ is the distance from the incoming port number u to a current point; $k_m$ is the wave vector of an outgoing wave, and $r_v$ is the distance from the outgoing port number v to the current point; It should be noted that according to the invention, digitization of planar holography consists of replacing the continuous functions $f_{in}(x, y, \omega)$ and $f_{out}(x, y, \omega)$ by finite numbers ("n" and "m") of values as a result of decomposition into the Fourier series. This decomposition is used for replacing $f_{in}(x, y, \omega)$ and $f_{out}(x, y, \omega)$ in the aforementioned formula $\Delta n(x, y) = \int f_{in}(x, y, \omega) f_{out}(x, y, \omega) d\omega$. It is clear that instead of a continuous function $\Delta n = \Delta n(x, y)$, we will obtain a discrete number of values of An associated with predetermined coordinates that determine positions of the pattern elements of the holographic pattern.

In order to simplify production of the planar digital structure, in the aforementioned calculations, variation of the effective refractive index $\Delta n(x, y)$ can be approximated by a two-level binary function to form the pattern elements of the holographic pattern, e.g., as rectangular dashes.

In particular, the invention relates to the digital processing of light, wherein chains of lasers, amplifiers, and fast saturating absorbers exhibit two or more attractors. A light logical gate is one example of a device that can be made according to this new technology.

Further aspects of the invention will become apparent when considering the drawings and the ensuing description of the preferred embodiments of the invention.

FIG. 1 is a schematic view that exemplifies a planar structure or a holographic chip with a digital planar optical holographic pattern. In this drawing, the planar structure as a whole is designated by reference numeral 10. Reference numerals $12_a$, $12_b$, ... $12_p$, designate active planar optical elements such as semiconductor laser diodes, where "p" is the number of the aforementioned lasers diodes. Although FIG. 1 shows only three laser diodes (p=3), the number "p" may vary in a wide range. Reference numerals 14a, 14b, ... 14f designate planar semiconductor amplifiers, where "f" is the number of such semiconductor amplifiers. As in the case of laser diodes, the number "f" may vary in a wide range. The holographic chip 10 of the illustrated embodiment also contains planar semiconductor receivers 16a, 16b, ... 16g, where "g" is the number of semiconductor receivers.

All above-mentioned planar optical elements are arranged on a common semiconductor substrate made from, e.g., InP-GaAs and, depending on the type of the element, may have one or two input/output ports. For example, as shown in FIG. 1, the semiconductor laser diode 12a has only an output port 12a1 for emission of an output light beam 12a-out. In the present embodiment, it is assumed that all three laser diodes 12a, 12b, and 12p are identical and have respective output ports 12a2 and 12p for emission of output light beams 12b-out and 12p-out, respectively. Each of the planar semiconductor amplifiers 14a, 14b, ... 14f has one input port and one output port. For example, the planar semiconductor amplifier 14a has an input port 14a1 and an output port 14a2; the planar semiconductor amplifier 14b has an input port 14a1 and an output port 14b2; and the planar semiconductor amplifier 14f has an input port 14f1 and an output port 14f2. In FIG. 1, reference numerals 14a-in, 14b-in, and 14f-in designate input light beams that enter respective amplifiers 14a, 14b, and 14f. Reference numerals 14a-out, 14b-out, and 14f-out designate output light beams that exit respective amplifiers 14a, 14b, and 14f.

On the other hand, each of the planar semiconductor receivers 16a, 16b, ... 16g has only an input port. In other words, the planar semiconductor receiver 16a has an input port 16a1, the planar semiconductor receiver 16b has an input port 16b1, and the planar semiconductor receiver 16g has an input port 16g1. Reference numerals 16a-in, 16b-in, and 16g-in designate input light beams that enter respective planar semiconductor receivers 16a, 16b, ... 16g.

In FIG. 1, reference numerals 18a, 18b, 18k designate interconnecting pattern elements of the holographic pattern, which, according to the invention, controls directions and properties of the light beams distributed over the entire planar structure of the chip 10 in accordance with the aforementioned holographic pattern. As mentioned above, for simplification of calculations and production, these pattern elements are made in the form of rectangular dashes of the type shown in FIG. 1.

Figure 2:
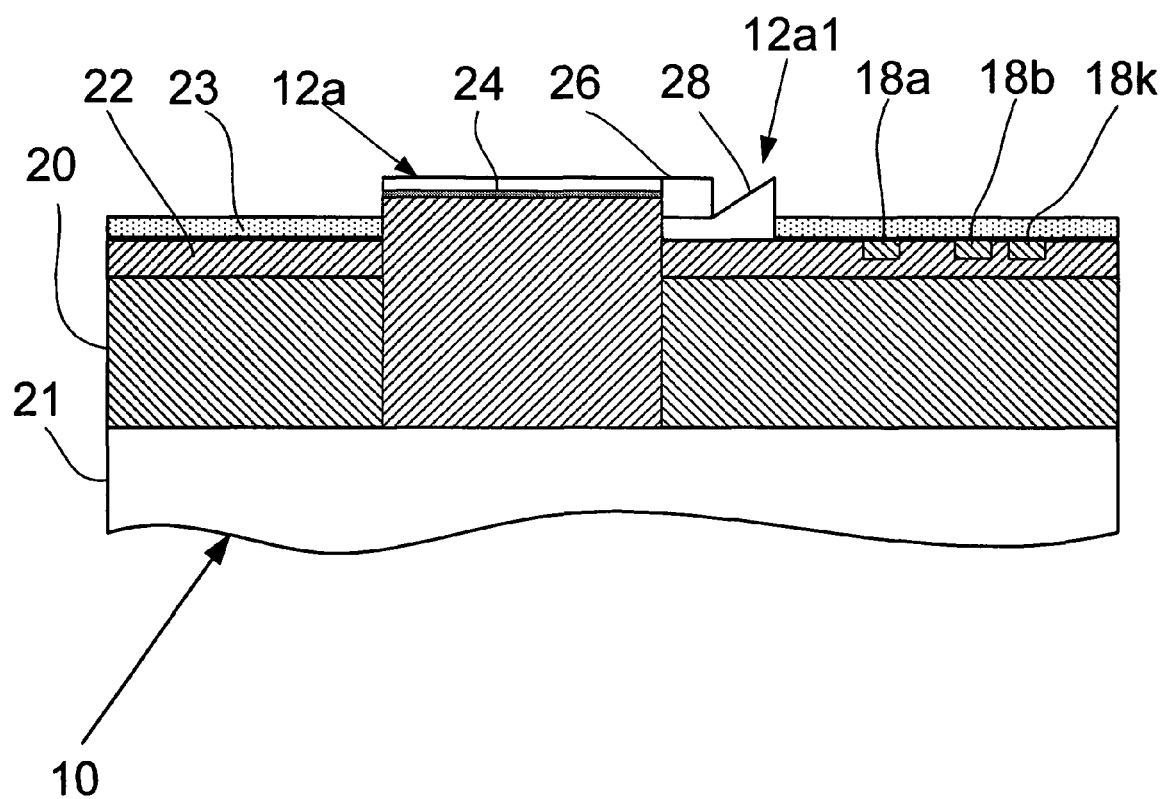
FIG. 2 is a longitudinal sectional view of the laser diode used in the holographic chip of FIG. 1.
Figure 3:
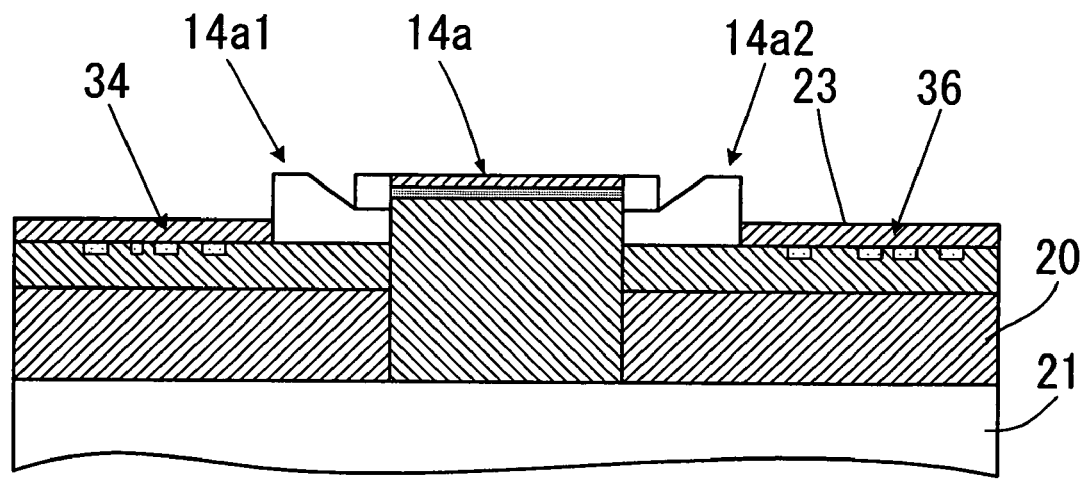
FIG. 3 is a longitudinal sectional view of the planar semiconductor amplifier used in the holographic chip of FIG. 1.
Figure 4:
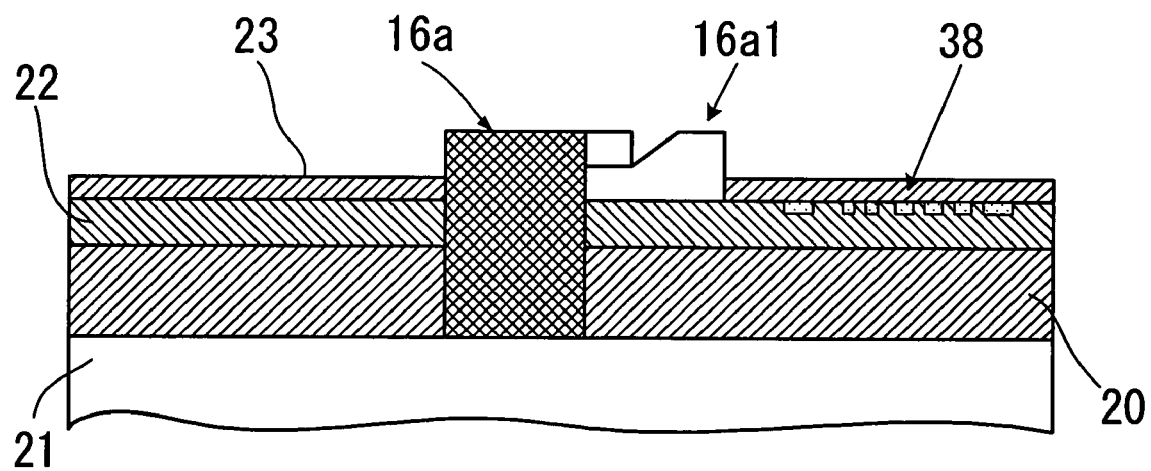
FIG. 4 is a sectional view through the chip in the direction of the longitudinal axis of the planar semiconductor light-beam receiver.

FIG. 1 is a generalized topology of a typical digital planar holographic chip of the present invention that shows arrangement of the optical and holographic elements and interaction therewith. It should be noted that the optical elements of three types shown in FIG. 1 do not limit the scope of the invention and that active and passive elements of other types also may be used, such as frequency multipliers, modulators, attenuators, frequency mixers, etc. More detailed structures of the planar laser diode 12a, a planar semiconductor amplifier 14a, and a planar semiconductor receiver 16a are shown in FIGS. 2, 3, and 4, respectively. Since all of the lasers are identical, all of the amplifiers and receivers are identical as well; therefore, only one typical representative of each of these devices is shown in the respective drawings.

As shown in FIG. 2, which is a sectional view through the chip 10 in the direction of the longitudinal axis of the laser diode 12a, the latter is formed on a semiconductor substrate 21 and has a planar optical resonator 24 that emits from its edge (edge-emitting) an optical beam, from which the micro-optical system 26 forms a diffractively limited optical beam. The latter is introduced into the light-propagating and distributing layer 22 that contains the aforementioned elements 18a, 18b, . . . 18k of the digital holographic pattern. Reference numeral 28 designates an optical microprism, which together with the micro-optical system 26, forms the aforementioned output port 12a1. The light-propagating and distributing layer 22 is supported by a lower cladding 20 of the holographic chip 10 and is coated with an upper cladding 23. The elements 18a, 18b, . . . 18k of the digital holographic pattern are made in flash with the surface of the light-propagating and distributing layer 22. As mentioned above, according to the invention, the respective elements 18a, 18b, . . . 18k of the digital holographic pattern have specific refractive indices different from refractive indices of the layers 22 and 23. The geometry and orientations of the aforementioned elements 18a, 18b, . . . 18k control the characteristics and directions of the light beams that pass through these elements.

FIG. 3 is a sectional view through the chip 10 in the direction of the longitudinal axis of the semiconductor amplifier 14a. Since the planar semiconductor amplifier 14a is located in the same chip 10, the substrate, cladding layers, etc., will be the same as in the case of the semiconductor laser diode, and their description will be omitted. The difference between the semiconductor amplifier 14a and the semiconductor laser diode 12a is that the amplifier has one input port 14a1 and one output port 14a2. It is understood that the groups 34 and 36 of the elements of the digital holographic pattern will be different from those related to the semiconductor laser diode 12a. In other words, elements of the group 34 participate in control of the input light beam 14a-in (FIG. 1), while elements of the group 36 participate in control of the output light beam 14a-in.

FIG. 4 is a sectional view through the chip 10 in the direction of the longitudinal axis of the planar semiconductor light-beam receiver 16a. Since the planar semiconductor light-beam receiver 16a is located in the same chip 10, the substrate, cladding layers, etc., will be the same as in the case of the semiconductor laser diode, and their descriptions will be omitted. The difference between the semiconductor light-beam receiver 16a and other planar semiconductor optical elements is that the receiver 16a has only one light-receiving port 16a1. It is understood that the group 38 of the elements of the digital holographic pattern will be different from those related to the semiconductor laser diode 12a and the semiconductor amplifier 14a. In other words, elements of the group 38 participate in control of the input light beam 16a-in (FIG. 1).

Physically, the aforementioned elements of the digital holographic pattern 18a, 18b, . . . 18k (FIG. 1), which include all groups 34, 36, and 38 shown in FIGS. 2 and 3, comprise grooves formed in the light-propagating and distributing layer 22, which are filled with an optical material different from the material having a refractive index different from that of other structural layers of the chip 10. The aforementioned elements may also be made in the form of metallic or dielectric stripes, recesses, projections, grooves, etc., or any other elements that can be produced by optical, e-beam, or other type of microlithography, or by nanoprinting on a planar substrate made from, e.g., a semiconductor material. Longitudinal dimensions of the pattern elements 18a, 18b, . . . 18k may be in the range from fractions of microns to dozens of microns. Transverse dimensions may range from a fraction of a micron to several microns. It is understood that these ranges are given only as examples.

In operation, pattern elements 18a, 18b, . . . 18k control direction of propagating light, i.e., function in accordance with a given law as $\Delta n = \Delta n(x, y)$. As a result, it becomes possible to replace the continuous function of conversion of $f_{in}(x, y, \omega)$ into $f_{out}(x, y, \omega)$ by a finite and discrete number of elements (holographic patterns) on a planar substrate.

Thus, it has been shown that the present invention provides a new method of making digital and analog light processors on a single chip consisting of a planar waveguide with several standard elements repeated many times. The invention also provides an integrated planar optical device based on digital planar holography. Approximation of variations in the function of the effective refractive index to the form of a two-level binary function simplifies production and makes it possible to present the elements of the holographic pattern in the form of rectangular elements or dashes that can be easily produced by methods of microlithographic technique. The holographic patterns obtained by the method have an arrangement different from traditional holographic patterns and look like a set of the elements randomly distributed over the plane. However, positions of these elements are most optimal for accomplishing a given task.

Although the invention has been shown and described with reference to specific embodiments, it is understood that these embodiments should not be construed as limiting the areas of application of the invention and that any changes and modifications are possible, provided that these changes and modifications do not depart from the scope of the attached patent claims. For example, the choice of the planar optical elements is not limited by planar laser diodes, planar semiconductor amplifiers, and planar semiconductor receivers, and may include other elements such as planar optical modulators, absorbers, or the like. The interconnecting pattern elements of the holographic pattern may have circular, elliptical, or other forms. The substrate can be made from a semiconductor material other than InPGaAs.

The invention claimed is:

1. A method of digitally processing light waves passing through a planar structure having given functions $f_{in}(x, y, \omega)$ and $f_{out}(x, y, \omega)$ and consisting of a light-propagating and distributing layer, a plurality of interconnecting pattern elements of a holographic pattern in said of light-propagating and distributing layer, and a plurality of planar optical elements arranged in a predetermined pattern on the aforementioned light-propagating and distributing layer, the method comprising the steps of:

calculating positions and shapes of the plurality of interconnecting pattern elements of a holographic pattern based on the aforementioned given functions $f_{in}(x, y, \omega)$ and $f_{out}(x, y, \omega)$ by a method of solving an inverse problem, said interconnecting pattern elements having refractive indices different from the refractive indices of the light-propagating and distributing layer, said method comprising the steps of:

manufacturing the interconnecting pattern elements of the holographic pattern based on the results of the calculations;

digitizing the aforementioned continuous functions $$f_{in}(x, y, \omega) \cong \sum_{n,u} C_{nu} \exp(ik_n r_u) f(\omega)$$

-continued and $$f_{out}(x, y, \omega) \cong \sum_{m,v} C_{mv} \exp(-ik_m r_v) f(\omega)$$

by providing finite numbers ("n", "m", "u", "v") of values as a result of decomposition into the Fourier series; where $k_n$ is the wave vector of an incoming wave, and $r_u$ is the distance from the incoming port number u to a current point; and $k_m$ is the wave vector of an outgoing wave, and $r_v$ is the distance from the outgoing port number v to a current point; and using the obtained digitized planar holographic pattern for converting the function $f_{in}(x, y, \omega)$ into the function $f_{out}(x, y, \omega)$.

2. method of claim 1, wherein manufacturing is carried out by a method selected from microlithography and nanoprinting.

3. The method of claim 1, wherein the step of calculating comprises varying the effective refraction index of $\Delta n(x, y)$ of the planar structure for using the effective refraction index of the interconnecting pattern elements of the holographic pattern different from the effective refraction index of the light-propagating and distributing layer in order to control directions and properties of the light beams that propagate through the aforementioned planar structure in accordance with the aforementioned holographic pattern.

4. The method of claim 3, wherein the variation of the effective refractive index $\Delta n(x, y)$ of the planar structure is made in accordance with formula $$\Delta n(x,y) = \int f_{in}(x,y,\omega) f_{out}(x,y,\omega) d\omega.$$

where $f_{in}(x, y, \omega)$ and $f_{out}(x, y, \omega)$ are the same as defined above.

5. The method of claim 4, wherein variation of the effective refractive index $\Delta n(x, y)$ is approximated by a two-level binary function to simplify production.

6. The method of claim 5, wherein the aforementioned interconnecting pattern elements of the holographic pattern are made in the form of rectangular dashes.

7. The method of claim 5, wherein the planar optical elements are selected from planar laser diodes, planar semiconductor amplifiers, and planar semiconductor receivers.

* * * * *